United States Patent [19]

Moyer

[11] 3,820,877
[45] June 28, 1974

[54] EXTENDABLE AND RETRACTABLE MOTOR VEHICLE MIRROR ARMS

[76] Inventor: James E. Moyer, 5727 Rio Verde Way, North Highlands, Calif. 95660

[22] Filed: Mar. 19, 1973

[21] Appl. No.: 342,547

[52] U.S. Cl............... 350/289, 74/501 M, 350/307
[51] Int. Cl. ............................................ G02b 5/08
[58] Field of Search ........... 350/289, 288, 299, 302, 350/307; 74/501 M

[56] References Cited
UNITED STATES PATENTS
3,527,528   9/1970   McKee et al................. 350/289 UX
3,624,818   11/1971   Stanfield............................ 350/289

Primary Examiner—Ronald L. Wibert
Assistant Examiner—Michael J. Tokar
Attorney, Agent, or Firm—Blair & Brown

[57] ABSTRACT

Motor vehicle mirror arms can be extended or retracted from the dashboard of the vehicle to a point beyond the width of the motor vehicle to enhance the visibility to the rear. The mirror arms are moved by hydraulic, air, vacuum, or electric means and can be positioned at any desired point from fully retracted to fully extended.

3 Claims, 5 Drawing Figures

EXTENDABLE AND RETRACTABLE MOTOR VEHICLE MIRROR ARMS

BACKGROUND OF THE INVENTION

FIELD OF THE INVENTION

The present invention relates to motor vehicle rear view mirrors which are adjustably expansible.

SUMMARY OF THE INVENTION

A motor vehicle rear view mirror system in which the mirrors can be extended or retracted at will from the dashboard and can be positioned at any point from fully retracted to fully extended. The extending and retracting mechanism is actuated hydraulically, by air, by vacuum or by electricity as desired.

The primary object of the invention is to provide a motor vehicle having extensible and retractable rear view mirrors which can be moved remotely from the dashboard.

Other objects and advantages will become apparent in the following specification when considered in the light of the attached drawings.

DESCRIPTION OF THE PREFERRED EMBODIMENT

Figure 1:
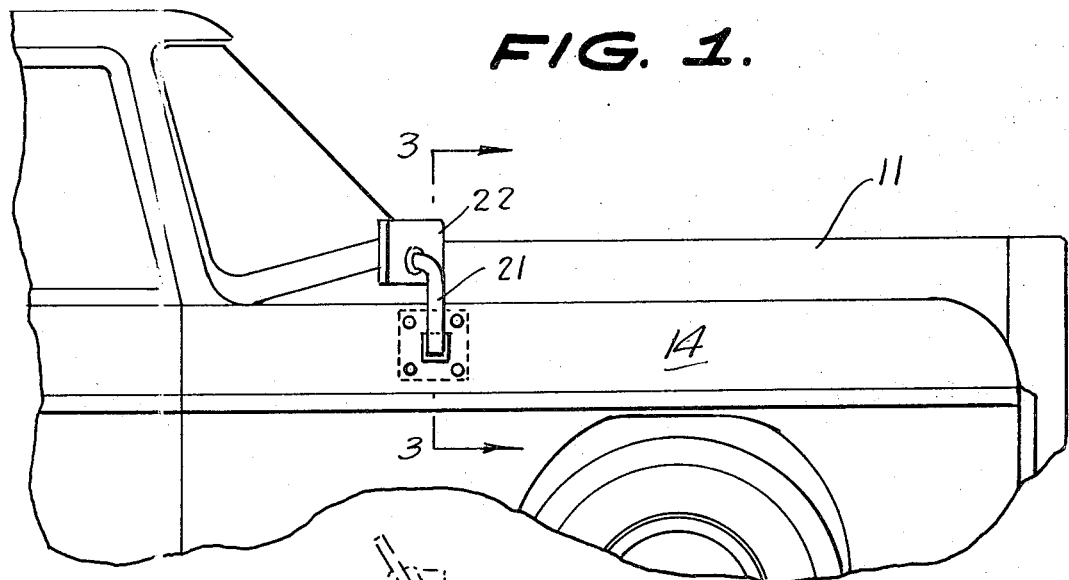
FIG. 1 is a fragmentary side elevation of the invention.

Referring now to the drawings in detail, wherein like reference characters indicate like parts throughout the several figures, the reference numeral 10 indicates generally a combined motor vehicle and extensible rear view mirror system constructed in accordance with the invention.

Figure 2:
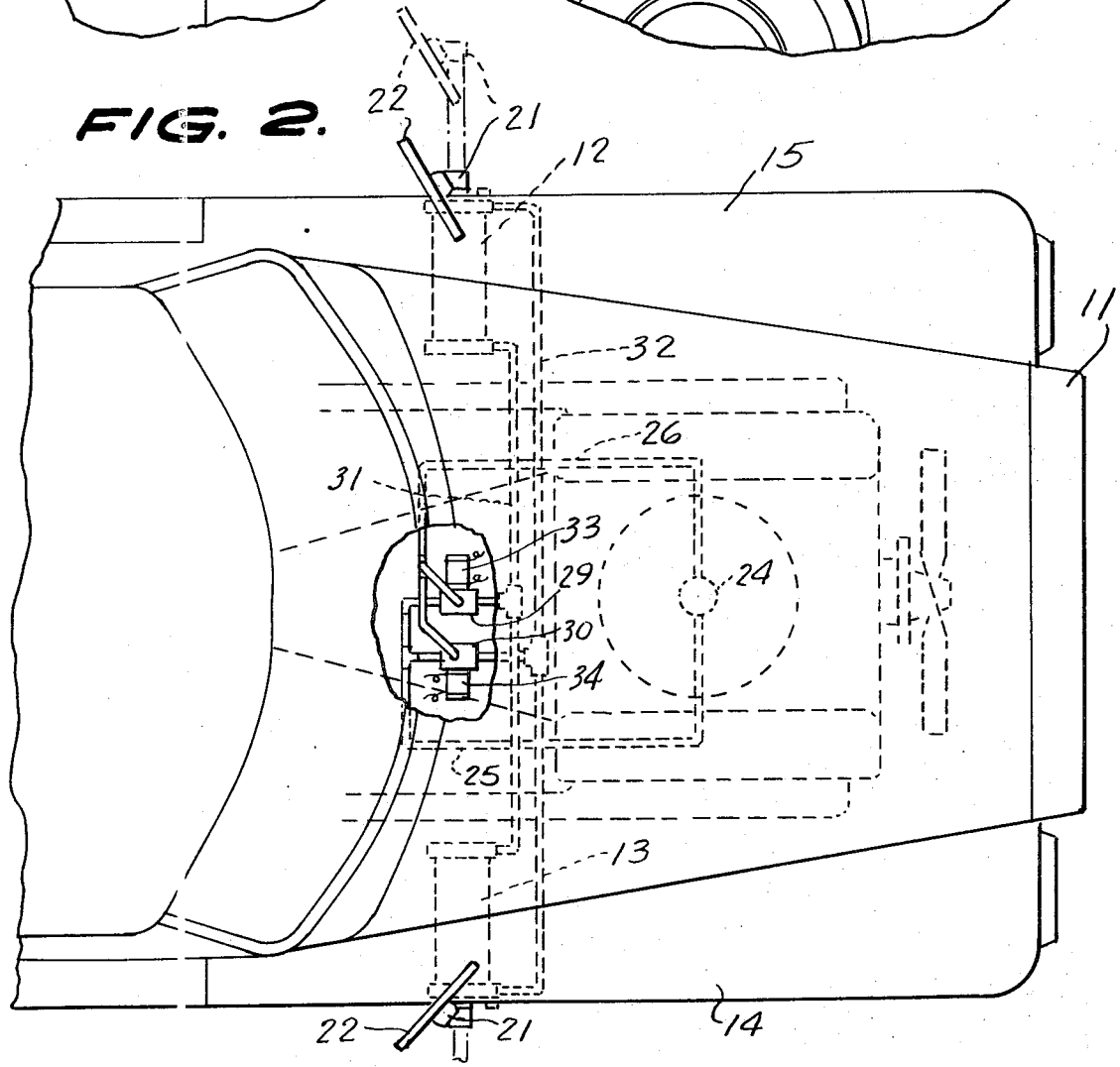
FIG. 2 is a fragmentary top plan view of the invention.
Figure 3:
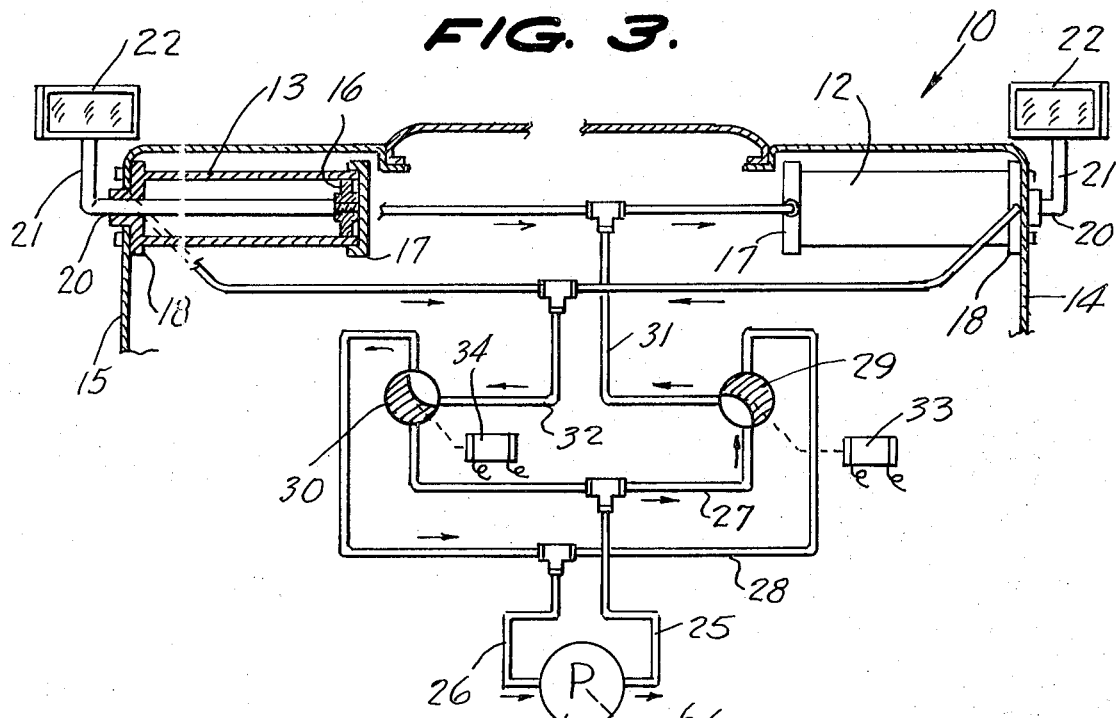
FIG. 3 is an enlarged fragmentary vertical sectional view, taken along the line 3—3 of FIG. 1, looking in the direction of the arrows.
Figure 4:
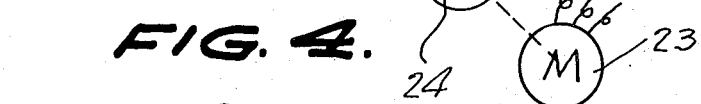
FIG. 4 is an enlarged cross-sectional view of one of the mirrors and its actuator.
Figure 4:
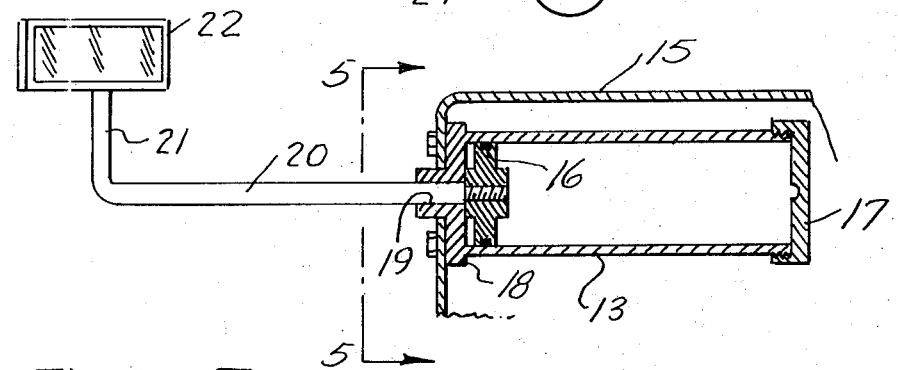
Figure 5:
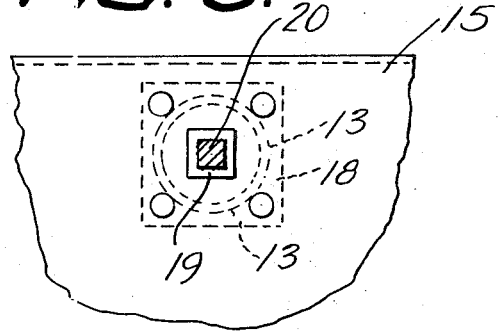
FIG. 5 is a longitudinal sectional view, taken along the line 5—5 of FIG. 4, looking in the direction of the arrows.

The system 10 is mounted on a motor vehicle 11 and includes a pair of hydraulic cylinders 12, 13 secured in axially aligned relation to the fenders 14, 15 of the motor vehicle 11. The hydraulic cylinders 12, 13 have their axes generally horizontal and are positioned within the fenders 14, 15 as can be clearly seen in FIGS. 2 and 3.

The hydraulic cylinders 12, 13 each include a reciprocating piston 16 and a pair of heads 17, 18 on opposite ends thereof. The head 18 has a square port 19 extending therethrough with a square piston rod 20 slidably mounted therethrough. The piston rod 20 is connected at its inner end to the piston 16 and has an upstanding arm 21 formed on its outer end.

A rear view mirror 22 is mounted on each of the arms 21 in a position to permit the driver of the motor vehicle 11 to see to the rear along the side of the vehicle 11.

An electric motor 23 drives a hydraulic pump 24 connected by pipes 25, 26 to pipes 27 and 28 respectively. The pipe 27 is coupled to a valve 29 and the pipe 28 is coupled to a valve 30. The valve 29 is coupled by a pipe 31 to the inner ends of the cylinders 12, 13 and the valve 30 is coupled by a pipe 32 to the outer ends of the cylinders 12, 13. The valves 29, 30 are actuated by solenoids 33, 34 respectively controlled by suitable pushbuttons (not shown) on the dashboard of the motor vehicle 11.

In the use and operation of the invention the valves 29, 30 are adjusted to permit fluid from the pump 24 to flow to the inner end 17 of the hydraulic cylinders 12, 13. Fluid from the outer end thereof passes through the valve 30 back to the pump 24. This causes the pistons 16 to move outwardly in their respective cylinders 12, 13 to move the respective mirrors 22 outwardly to a desired position of extension. When this point is reached the valves 29, 30 are turned to prevent flow of fluid therethrough thus locking the mirrors 22 in their adjusted extended position. When it is desired to move the mirrors 22 inwardly the motor 23 is reversed to reverse the pump 24 causing the fluid to flow in the opposite directions in the linings 28, 31 to put pressure on the outer ends of the piston 16 thus moving the mirrors 22 inwardly.

While I have disclosed and described a hydraulic mechanism for actuating the mirrors 22 it should be understood that air or vacuum may also be used equally as well. The mirrors 22 may also be electrically actuated to move them outwardly of the vehicle 11 when desired.

The mirrors 22 can be extended to permit rear view past a wide trailer being towed behind the motor vehicle 11 and can then be retracted when the trailer is no longer in use to prevent the mirrors 22 from striking other vehicles or mirrors in relatively tight parking spaces.

In some instances the engine oil under pressure may be used to power the pistons instead of using a hydraulic pump.

Having thus described the preferred embodiment of the invention it should be understood that numerous structural modifications and adaptations may be resorted to without departing from the spirit of the invention.

What is claimed is:

1. A combined motor vehicle and an extensible and retractable rear view mirror system therefore comprising a pair of cylinders mounted on said motor vehicle in axially aligned generally horizontal relation, an L-shaped piston rod extending outwardly from each of said cylinders and carrying a mirror on the outer end thereof, a piston in each of said cylinders connected to said L-shaped piston rod for moving said L-shaped rod axially on the application of pressure to said pistons, and hand actuated means on said motor vehicle for controlling the movement of said pistons in said cylinders to control the extended and retracted position of said mirrors with respect to said vehicle.

2. A device as claimed in claim 1 wherein hydraulic means is provided for moving said pistons and said hand controlled means for controlling the position of said pistons comprises hydraulic lines extending to said pistons and valves mounted in said line.

3. A device as claimed in claim 1 wherein said pistons are air actuated.

* * * * *